(12) United States Patent  
Strittmatter et al.

(10) Patent No.: US 8,805,458 B2  
(45) Date of Patent: Aug. 12, 2014

(54) BATTERY RETENTION SYSTEM

(75) Inventors: Patrick Clement Strittmatter, Frisco, TX (US); Paul Daniel Everest, Flower Mound, TX (US); Devin Bertrum Pauley, San Jose, CA (US); Thomas Kevin Swindle, Watauga, TX (US); Duc Hongle Ngo, Carrollton, TX (US)

(73) Assignee: BlackBerry Limited, Waterloo (CA)

( * ) Notice: Subject to any disclaimer, the term of this patent is extended or adjusted under 35 U.S.C. 154(b) by 109 days.

(21) Appl. No.: 13/396,262

(22) Filed: Feb. 14, 2012

(65) Prior Publication Data

US 2012/0281366 A1     Nov. 8, 2012

Related U.S. Application Data

(60) Provisional application No. 61/482,051, filed on May 3, 2011.

(51) Int. Cl.
 *H04M 1/00* (2006.01)
(52) U.S. Cl.
 USPC ............. 455/575.1; 361/679.02; 361/679.3
(58) Field of Classification Search
 USPC ............ 361/679.04, 679.56, 679.02, 679.3; 429/88, 95; 292/80, 81, 85, 87, 89, 292/194, 195, 198, 202, DIG. 37, DIG. 38, 292/144, 175, 201, 156; 455/575.1; 379/433.11, 428.01
 See application file for complete search history.

(56) References Cited

U.S. PATENT DOCUMENTS

| | | | |
|---|---|---|---|
| 3,850,464 A | 11/1974 | Bisbing et al. | |
| 4,390,198 A | 6/1983 | Selinko | |
| 4,583,774 A | 4/1986 | Holden et al. | |
| 5,006,959 A * | 4/1991 | Freige et al. | 361/679.49 |
| 5,121,952 A | 6/1992 | Jason | |
| 6,127,802 A | 10/2000 | Lloyd et al. | |
| 6,212,366 B1 | 4/2001 | Cheraso et al. | |
| 7,986,524 B2 * | 7/2011 | Dong et al. | 361/679.55 |
| 8,320,122 B2 * | 11/2012 | Liu | 361/679.56 |
| 2007/0298318 A1 * | 12/2007 | Li | 429/97 |
| 2009/0258287 A1 * | 10/2009 | Shi | 429/100 |
| 2009/0303668 A1 * | 12/2009 | Zhao et al. | 361/679.01 |
| 2010/0081043 A1 * | 4/2010 | Huang et al. | 429/96 |
| 2011/0188178 A1 * | 8/2011 | Myers et al. | 361/679.01 |
| 2013/0141845 A1 * | 6/2013 | Nuernberger et al. | 361/679.01 |
| 2013/0160248 A1 * | 6/2013 | Keyaki et al. | 24/388 |

OTHER PUBLICATIONS

Extended European Search Report from related European Patent Application No. 12166589.7 dated Sep. 4, 2012; 7 pages.

* cited by examiner

*Primary Examiner* — Lisa Lea Edmonds  
*Assistant Examiner* — Keith Depew  
(74) *Attorney, Agent, or Firm* — Fitch, Even, Tabin & Flannery LLP

(57) ABSTRACT

A battery protection mechanism is provided within an electronic device. A door has a latch which fits into a latch retention-release mechanism in the base of the device. A spring under tension within a retention-release mechanism presses against the latch when the device is in a closed configuration. A foot attached to a button in the base of the device urges the door out of position upon depression or activation of the button.

12 Claims, 11 Drawing Sheets

BATTERY RETENTION SYSTEM

CROSS-REFERENCE TO RELATED APPLICATION

This application claims benefit of Provisional U.S. Application No. 61/482,051, which is incorporated by reference in its entirety herein.

FIELD

The present disclosure relates generally to mobile electronic devices. More specifically, enabling implementations relate to mobile electronic devices having a removable battery cover connected to a base via a door-retention apparatus.

BACKGROUND

Mobile electronic devices are becoming more prevalent and more advanced. Mobile electronic devices can include, but are not limited to, cellular telephones, smart telephones, wireless personal digital assistants (PDAs) and the like, and laptop computers with wireless 802.11 or Bluetooth capabilities. These devices can run on a wide variety of networks from data-only networks such as Mobitex® and DataTAC® networks to complex voice and data networks such as GSM/GPRS, CDMA, EDGE, UMTS and CDMA2000 networks. Electronic devices can be powered by removable electrical batteries stored within their housing. Batteries can be held in place and shielded by a removable battery cover connected to a base via a door-retention apparatus which can be selectively opened or selectively removed.

DETAILED DESCRIPTION

Figure 1:
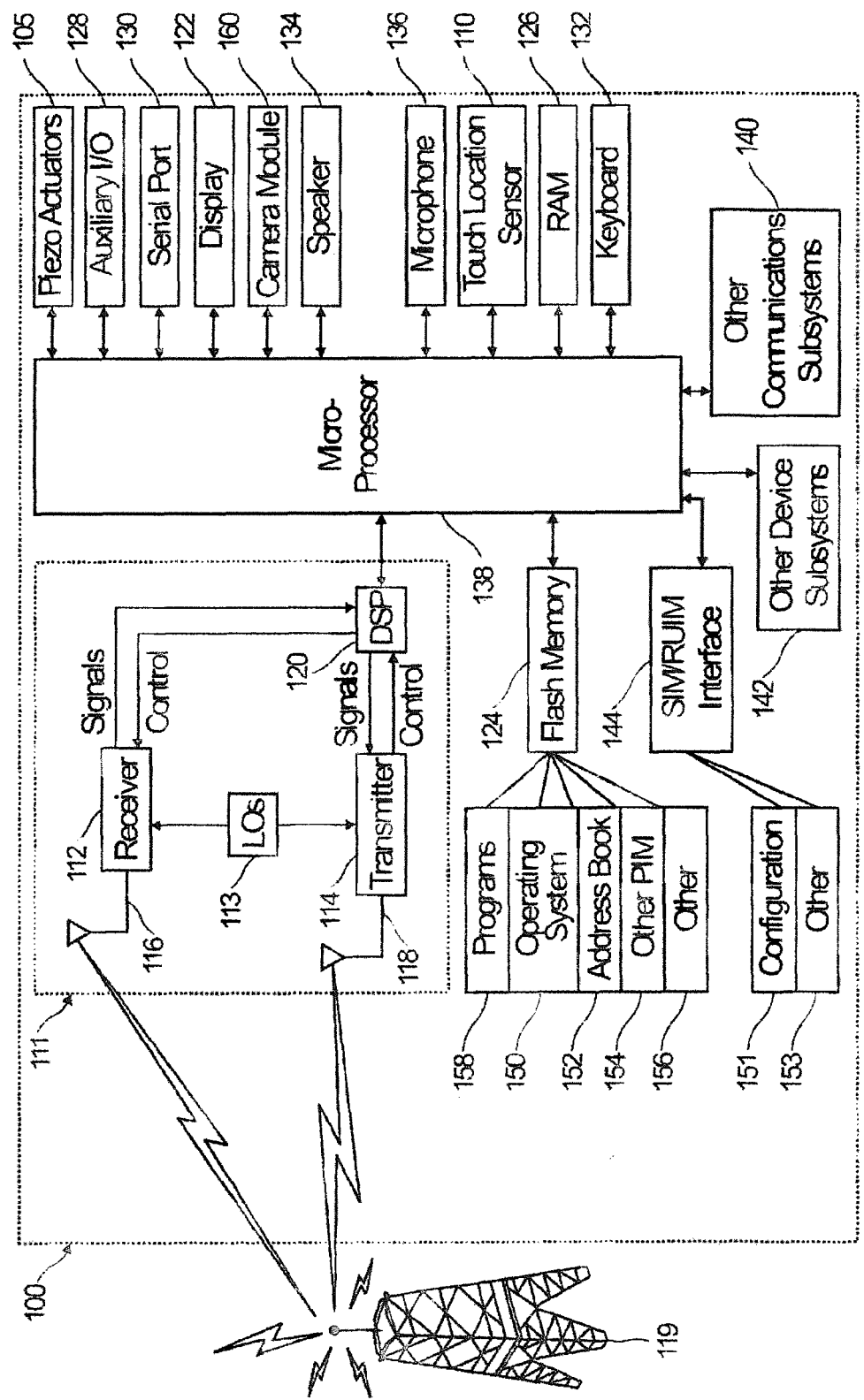
FIG. 1 illustrates a block diagram of an electronic device in a communication network in accordance with an exemplary embodiment.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood that the implementations described herein can be practiced without these specific details. In other instances, methods, procedures and components have not been described in detail so as not to obscure the related relevant feature being described. Also, the description is not to be considered as limiting the scope of the implementations described herein.

The technology includes methods, uses and implementations of one or more releasable covers or doors in a mobile electronic device.

Several definitions that apply throughout the disclosure of the technology will now be presented. The term "coupled" is defined as connected, whether directly or indirectly through intervening components, and is not necessarily limited to physical connections. The term "communicatively coupled" is defined as connected, whether directly or indirectly through intervening components, is not necessarily limited to a physical connection, and allows for the transfer of data. "Coupled" or "mechanically coupled" refers to a relationship between items which may have one or more intermediate parts or items to which they are connected The term "electronic device" is defined as any electronic device that is capable of at least accepting information entries from a user and includes the device's own power source. A "wireless communication" includes communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The term "spring" can include a spring mechanism or spring device such as a steel spring or a coil spring. Such a spring can be constructed of other suitable materials if desired such as tungsten.

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present disclosure include such modifications and variations that come within the scope of the technology.

Referring to FIG. 1, an example electronic device 100 can be communicatively coupled to a wireless network 119. FIG. 1 and the other figures illustrate non-limiting examples and modifications may be necessary to make an electronic device 100 work in particular network environments. In the illustrated implementation, the electronic device 100 is a smart phone. In other implementations, however, an electronic device 100 can be a personal digital assistant (PDA), laptop computer, desktop computer, server, or other electronic device capable of sending and receiving electronic messages.

With further reference to FIG. 1, a block diagram of an electronic device 100 in a communication network 119 in accordance with an exemplary implementation is illustrated. As shown, the electronic device 100 can include a microprocessor 138 that controls the operation of the electronic device 100, such as facilitating communications, providing a graphical user interface, executing programs, and so forth. A communication subsystem 111 performs communication transmission and reception with the wireless network 119. The microprocessor 138 can be coupled to piezoelectric actuators 105 housed within the electronic device 100. The microprocessor 138 further can be coupled with an auxiliary input/output (I/O) subsystem 128 that can be coupled to the electronic device 100. Additionally, in at least one implementation, the microprocessor 138 can be coupled to a serial port (for example, a Universal Serial Bus port) 130 that facilitates communication with other devices or systems via the serial port 130. A display 122 can be communicatively coupled to the microprocessor 138 to facilitate display of information to an operator of the electronic device 100. Piezoelectric actuators 105 can be housed proximate the display 122 and can enable the electronic device 100 to transmit data in conjunction with, in complement to, or instead of, information transmitted through the display 122. When the electronic device 100 is equipped with a keyboard 132, which can be physical or virtual (for example, displayed), the keyboard 132 can be communicatively coupled to the microprocessor 138. The electronic device 100 can include one or more speakers 134 and one or more microphones 136, which can advantageously be communicatively coupled to the microprocessor 138 and discussed in further detail below. Other communication subsystems 140 and other electronic device subsystems 142 are generally indicated as communicatively coupled with the microprocessor 138. An example of a communication subsystem 140 is a short-range communication system such as a BLUETOOTH® communication module or a WI-FI communication module (a communication module in compliance with IEEE 802.11(b) and associated circuits and components. Additionally, the microprocessor 138 can perform operating system functions and executes programs or software applications on the electronic device 100. In some implementations, not all of the above components are included in the electronic device 100. The auxiliary I/O subsystem 128 can take the form of one or more different navigation tools (multi-directional or single-directional), external display devices such as keyboards, and other subsystems capable of providing input or receiving output from the electronic device 100.

The auxiliary I/O subsystem 128 can take the form of a variety of different navigation tools (multi-directional or single-directional) such as an optical navigation module or tool. In other implementations, a trackball, thumbwheel, a navigation pad, a joystick, touch-sensitive interface, or other I/O interface can be used. The navigation tool can be located on a front surface of the electronic device 100 or may be located on any exterior surface of the electronic device 100. Other auxiliary I/O subsystems can include external display devices and externally connected keyboards (not shown). While the above examples have been provided in relation to the auxiliary I/O subsystem 128, other subsystems capable of providing input or receiving output from the electronic device 100 are considered within the scope of the technology. Additionally, other keys may be placed along the side of the electronic device 100 to function as escape keys, volume control keys, scrolling keys, power switches, or user programmable keys, and may likewise be programmed accordingly.

Figure 2:
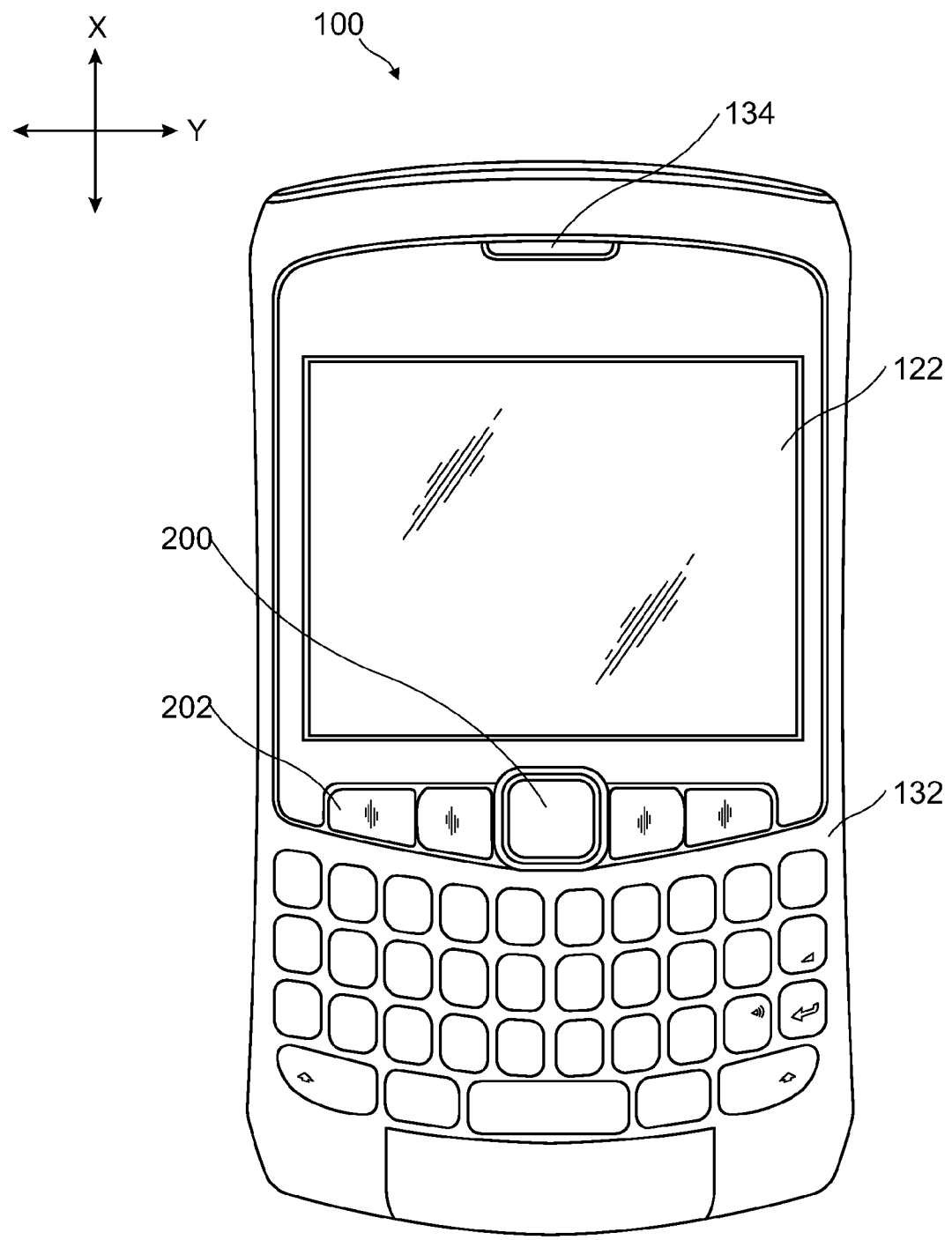
FIG. 2 illustrates a front view of an electronic device in accordance with an exemplary embodiment.

As may be appreciated from FIG. 2, the electronic device 100 can have a display 122 located above the keyboard 132 constituting a user input and suitable for accommodating textual input to the electronic device 100. The front face of the electronic device 100 can have a navigation row 202. As shown, the electronic device 100 can be of a unibody construction, also known as a "candy-bar" design. In alternate implementations, the electronic device 100 can be a "clamshell" or a "slider" design.

As described above, the electronic device 100 can include the auxiliary input 128 that acts as a cursor navigation tool 200 and which can be also exteriorly located upon the front face of the electronic device 100. The front face location of the navigation tool 200 can allow the navigation tool to be easily thumb-actuable or finger-actuable like the keys of the keyboard 132. An implementation provides the navigation tool in the form of the optical navigation module having one or more sensors, such as a capacitive sensor, optical sensor, or both, which can be utilized to instruct two-dimensional or three-dimensional screen cursor movement in substantially any direction, as well as act as an actuator when the optical navigation module is depressed like a button. The placement of the navigation tool 200 may be above the keyboard 132 and below the display 122; here, it can avoid interference during keyboarding and does not block the operator's view of the display screen 122 during use, for example, as shown in FIG. 2. The navigation tool 200 can reside within the navigation row 202, as shown.

The electronic device 100 can be configured to send and receive messages. As will be described in greater detail below, the device 100 can be enabled to actuate one or more actuators 105 upon the sending or receiving of email or both sending and receiving email. The electronic device 100 includes a body or housing which can, in some implementations, be configured to be held in one hand by an operator of the electronic device 100 during text entry. The display 122 is included which is located on the front face of the body and upon which information is displayed to the operator during text entry. The electronic device 100 can also be configured to send and receive voice communications such as electronic telephone calls. As will be described in greater detail below, a device 100 can be configured to actuate one or more actuators 105 upon the sending telephone calls or receiving telephone calls or both sending and receiving telephone calls. The electronic device 100 can also include a camera 160 to allow the user to take electronic photographs which can be referred to as photos or pictures.

The electronic device 100 can be equipped with components to enable operation of various programs, as shown in FIG. 1. As shown, the memory 124 can provide storage for the operating system 150, device programs 158, data, and the like. The operating system 150 can be generally configured to manage other programs 158 that are also stored in memory 124 and executable on the processor 138. The operating system 150 can handle requests for services made by programs 158 through predefined program 158 interfaces. More specifically, the operating system 150 can typically determine the order in which multiple programs 158 are executed on the processor 138 and the execution time allotted for each program 158, manages the sharing of memory 124 among multiple programs 158, handles input and output to and from other device subsystems 142, and so forth. In addition, operators can interact directly with the operating system 150 through a user interface, typically including the keyboard 132 and display screen 122. The operating system 150, programs 158, data, and other information can be stored in memory 124, RAM 126, read-only memory (ROM), or another suitable storage element (not shown). An address book 152, personal information manager (PIM) 154, and other information 156 can also be stored.

The electronic device 100 can be enabled for two-way communication within voice, data, or voice and data communication systems. A Subscriber Identity Module (SIM) or Removable User Identity Module (RUIM) 144 can be utilized to authorize communication with the communication network 119. A SIM/RUIM interface within the electronic device 100 can interface a SJM/RUIM card to the microprocessor 138 and facilitates removal or insertion of a SIM/RUIM card (not shown). The SIM/RUIM card features memory and can hold key configurations 151, and other information 153 such as identification and subscriber related information. The electronic device 100 can be equipped with an antenna 118 for transmitting signals to the communication network 119 and another antenna 116 for receiving communication from the communication network 119. Alternatively, a single antenna (not shown) can be utilized to transmit and receive signals. A communication subsystem 111 can include a transmitter 114 and receiver 112, one or more antennae 116, 118, local oscillators (LOs) 113, and a processing module 120 such as a digital signal processor (DSP) 120.

The electronic device 100 can comprise a display 122 that includes a touch-sensitive display or touchscreen that includes one or more touch location sensors 110, an overlay, and a display, such as a liquid crystal display (LCD) or light emitting diode (LED) display, such as shown in FIG. 2. The touch location sensor(s) can be a capacitive, resistive, infrared, surface acoustic wave (SAW), or other type of touch-sensitive sensor and can be integrated into the overlay. The overlay, or cover, can be comprised of laminated glass, plastic, or other suitable material(s) and is advantageously translucent or transparent. A touch, or touch contact, can be detected by a touchscreen and processed by the processor 138, for example, to determine a location of the touch. Touch location data can include the center of the area of contact or the entire area of contact for further processing. A touch may be detected from a contact member, such as a body part of a user, for example a finger or thumb, or other objects, for example a stylus, pen, or other pointer, depending on the nature of the touch location sensor.

Referring to FIG. 2, a front view of the electronic device 100 in accordance with an exemplary implementation is illustrated. As shown, the electronic device 100 can have a full QWERTY keyboard 132 or a reduced keyboard (not illustrated). Each key of the keyboard 132 can be associated with at least one indicia representing an alphabetic character, a numeral, or a command, (such as a space command, return command, or the like). The plurality of the keys having alphabetic characters can be arranged in a standard keyboard layout. This standard keyboard layout can be a QWERTY layout, a QZERTY layout, a QWERTZ layout, an AZERTY layout, a Dvorak layout, a Russian keyboard layout, a Chinese keyboard layout, or other similar layout. These standard layouts are provided by way of example and other similar standard layouts are considered within the scope of the technology. The keyboard layout can be based on the geographical region in which the handheld device 100 is intended for use or distribution. In some examples, the keyboard can be interchangeable such that the user can switch between layouts. In other examples, the keyboard is a virtual keyboard provided on a touch screen display 122.

As will be appreciated from FIG. 2, the exemplary mobile communication device 100 comprises the display 122 located above the keyboard 132 constituting a user input mechanism that is suitable for accommodating textual input to the device 100. In some implementations, the keyboard 132 can be part of a touch screen display. The front face of the device 100 has the navigation row 202. As shown, the device 100 is of unibody construction, also known as a "candy-bar" design, though other designs can also incorporate a battery door-retention and release apparatus.

The device 100 may include the auxiliary input that acts as the cursor navigation tool 200 and that may be also exteriorly located upon the front face of the device 100. The front face location of the cursor navigation tool 200 allows the tool to be thumb-actuable, e.g., like the keys of the keyboard 132. Some implementations of the technology provide the navigation tool 200 in the form of a trackball (not shown) that may be utilized to instruct two-dimensional screen cursor movement in substantially any direction, as well as act as an actuator when the trackball is depressed like a button. Other implementations can provide the navigation tool in the form of an optical trackpad, a touchpad, a pointing stick, joystick, graphics tablet, or combinations thereof. The placement of the navigation tool 200 can be above the keyboard 132 and below the display screen 122; here, it may avoid interference during keyboarding and does not block the operator's view of the display screen 122 during use.

The device 100 may be configured to send and receive messages. The device 100 includes a body which includes a base and battery hatch or door, that can, in some implementations, be configured to be held in one hand by an operator of the device 100 during text entry. A display 122 is included that is located on a front face of the body and upon which information is displayed to the operator, e.g., during text entry. The device 100 may also be configured to send and receive voice communications such as mobile telephone calls. The device 100 also can include a camera 302 to allow the device 100 to take electronic photographs. Further, the device 100 can be configured to operate a web browser.

Figure 3:
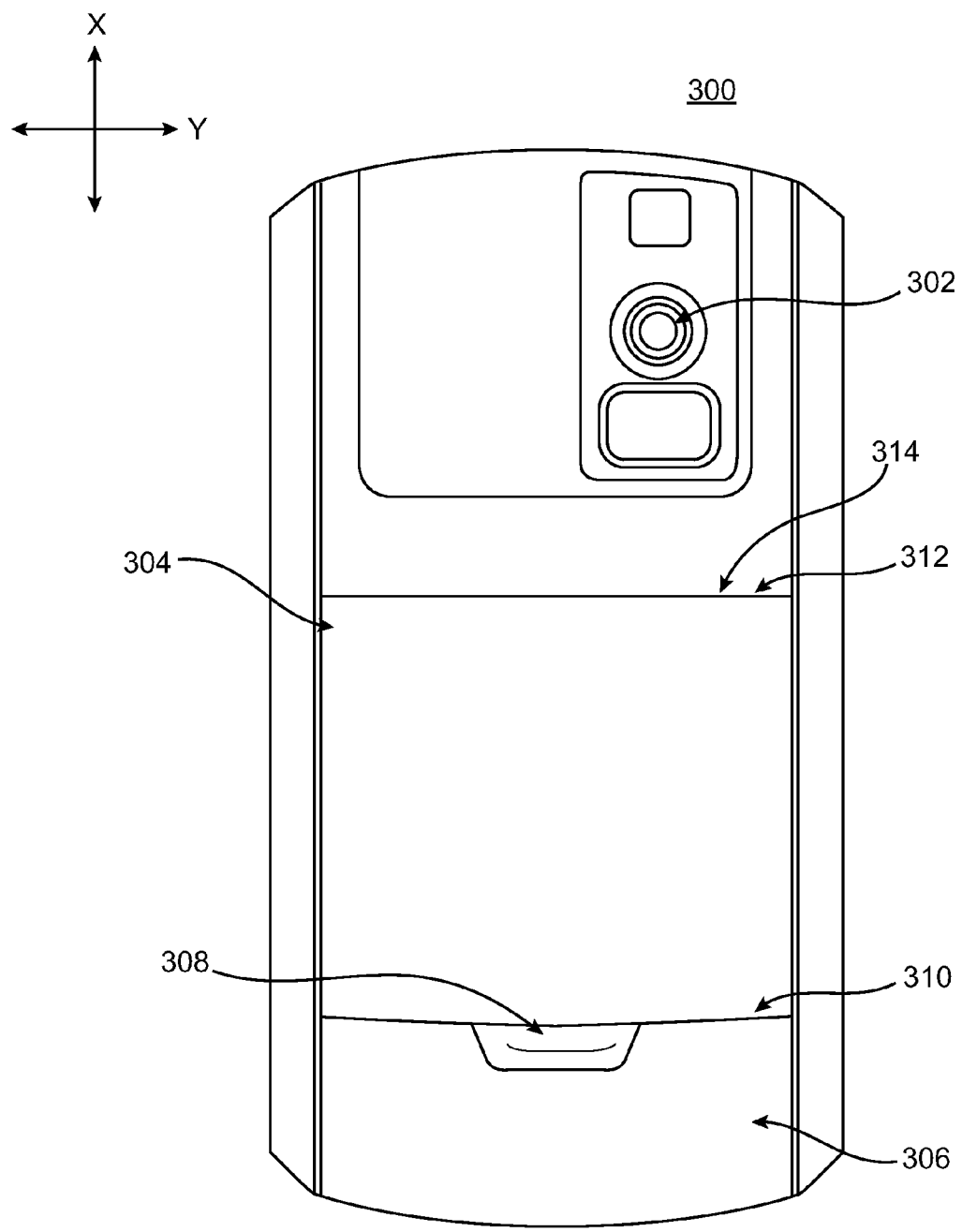
FIG. 3 illustrates a rear view of an electronic device in accordance with an exemplary embodiment.

FIG. 3 illustrates a rear view of an electronic device 100 within the technology. A door 304 resides within the base 306 of the device 100, beneath an optional camera apparatus. The upper edge 312 of the door 304 and the corresponding edge 314 of the base 306 can be configured to form a hinge mechanism forming an axis about which the door 304 can rotate when the battery retention apparatus of the device 100 is transitioned from a closed position 300 to an open position and from the open position to the closed position 300.

As will be explained in greater detail, at least one implementation within the technology is a battery-operated device 100 comprising: a door 304; at least one latch coupled to said door 304; a base 306; a cover plate attached to the base 306 (for example, by a weld such as but not limited to a sonic weld or a laser weld); a spring configured to receive the at least one latch, the spring bendably connected to the base 306 by the cover plate and imposing a retention force upon the latch when the system is in a closed configuration 300; at least one foot proximate the door 304 when the system is in the closed configuration 300; at least one shaft having an axis substantially parallel to the edge 310 of the door 304 upon which the latch is coupled; at least one depressible button 308, coupled to the at least one foot, and connected to the at least one shaft; the at least one depressible button 308 and the at least one foot rotatable about the axis, and configured to move the door 304 toward the open configuration via a force transmittable from the button 308 to the foot upon depression of the button 308 so as to overcome the retention force imposed by a spring mechanism upon the latch and hence to move the foot in a direction opposite a direction of motion of the button 308.

Thus a method of shielding and retaining a battery within an electronic device 100 is disclosed herein. Furthermore, a method of removably affixing a battery cover to a cover retention mechanism is disclosed herein. In at least one implementation of the technology, a bendable spring is interposed between a latch mechanism on a door 304 and a depressible button 308 within the base 306. When the device 100 is in a closed configuration, a spring device or mechanism imposes a retention force against the latch. The lower edge 310 of the door 304 and the inner side of the door 304, which are held in place by the bendable spring, press against the foot of a door release mechanism.

Figure 4:
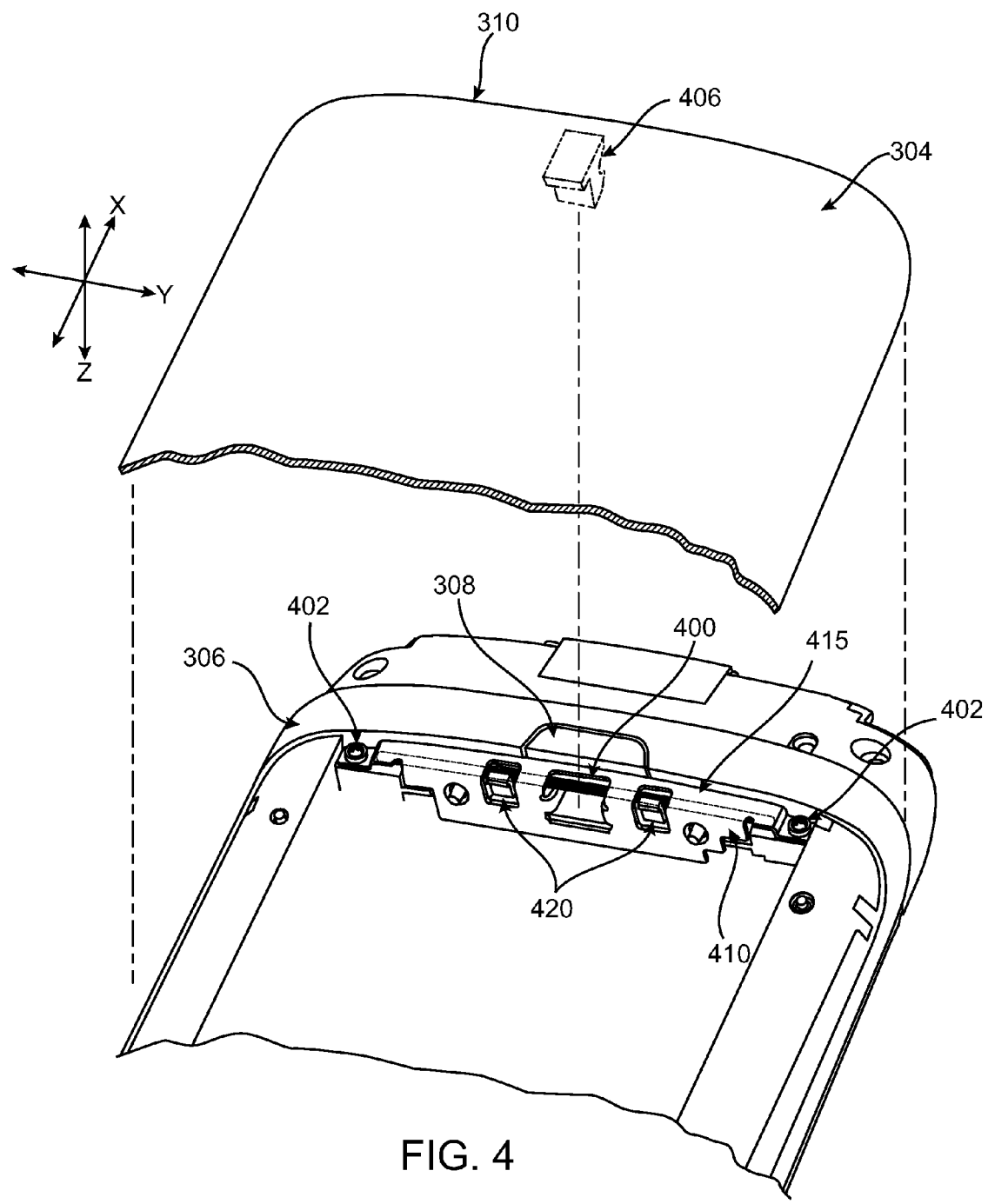
FIG. 4 illustrates a latch retention mechanism and a battery cover in accordance with an exemplary embodiment.

FIG. 4 illustrates a latch 406 retention mechanism (e.g., a spring 400 having, by one approach, a yield-strength substantially close to 1590 MPa (megapascals) and/or a spring constant substantially close to 16.5 N/m$^2$ (Newtons per square meter)) and a battery cover 304 within the technology. The battery cover or door 304 is shown in alignment with a receiving portion of the base 306 of a device 100. A spring 400 is held in place by a cover plate 410 affixed to the base 306. In the example illustrated in FIG. 4, the cover plate 410 is affixed to the base 306 by two screws 402. Other means of attaching the cover plate 410 to the base 306 are possible within the technology. If the cover plate 410 is attached to the base 306 with removable screws 402 this enables the cover plate 410 to be removed to allow access to the spring 400.

The spring 400 is retained in a frame formed by the cover plate 410 and a cavity 415 in the base 306. As will be explained in greater detail below, the spring 400 has a small amount of space within which it can bend in the cavity 415.

Figure 5:
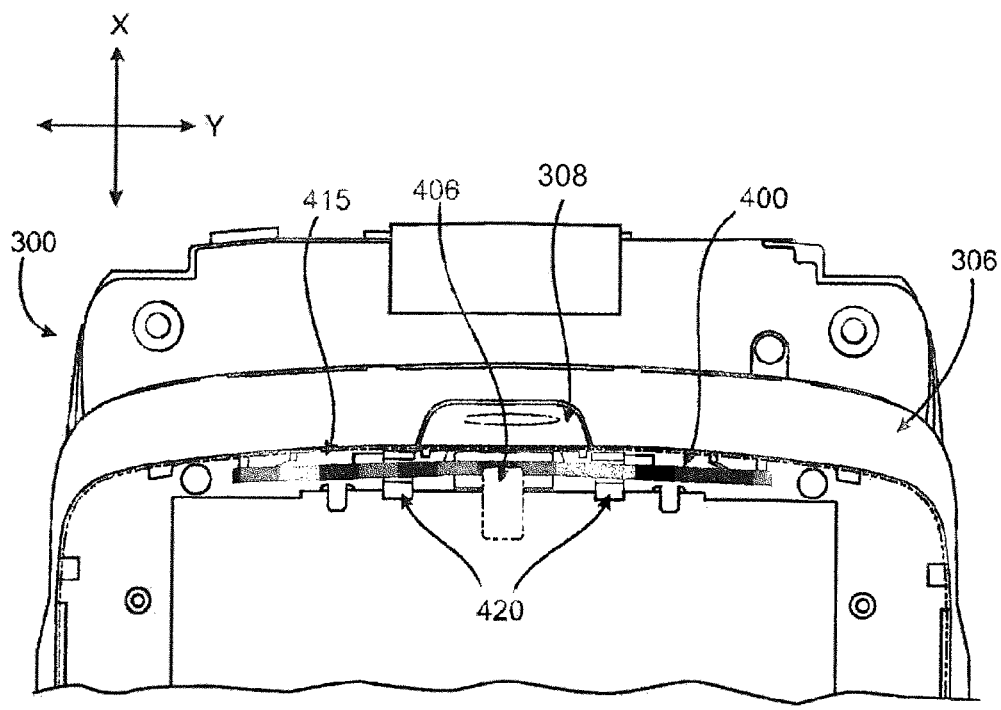
FIG. 5 illustrates a top plan view of a door release and retention mechanism of a mobile electronic device in accordance with an exemplary embodiment.

FIG. 5 illustrates a top plan view of a door release and retention mechanism 406 of a mobile electronic device 100 in a closed configuration. When the door 304 is in a closed position 300, the latch 406 and the spring 400 interact. The spring 400 is displaced from a natural state. The spring 400 is displaced in the positive x direction towards the bottom of the electronic device 100. Thus, the spring 400 is under strain.

Figure 6:
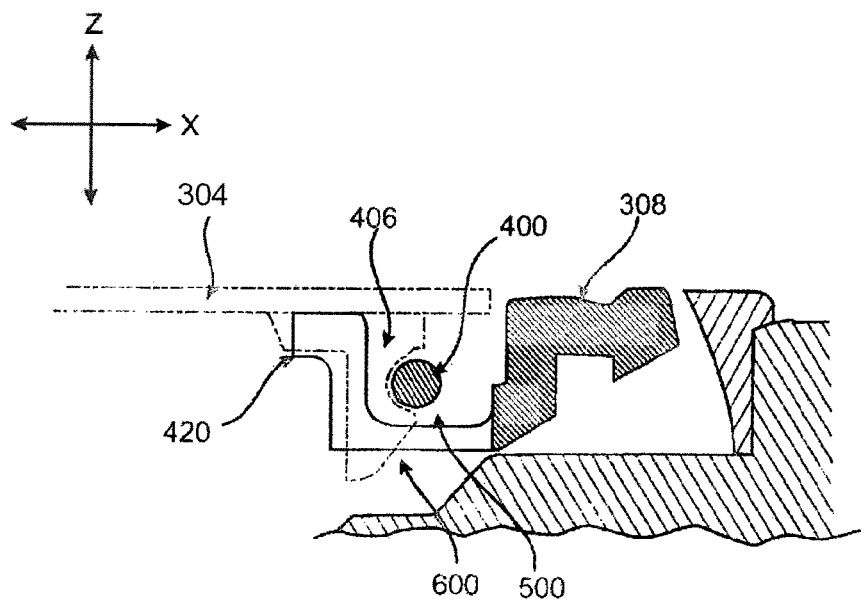
FIG. 6 illustrates a cross-section taken of a door release and retention mechanism in accordance with an exemplary embodiment as illustrated in FIG. 5.

FIG. 6 illustrates a cross-section taken of a door release and retention mechanism 406 as illustrated in FIG. 5. The latch 406 and door 304 are shown in broken lines to allow better appreciation of the release and retention mechanism 406. The retention mechanism 406 in the implementation illustrated in FIG. 5 comprises a spring 400 which presses against the latch 406 substantially in the negative x direction. When the device 100 is in the closed configuration 300 a central portion of the spring 400 bendably retains the door 304 within the base 306 by imposing a retention force upon the latch 406. As will be explained further below, the central portion of the spring 400 resides within a semi-circular cavity on the latch 406.

Figure 7:
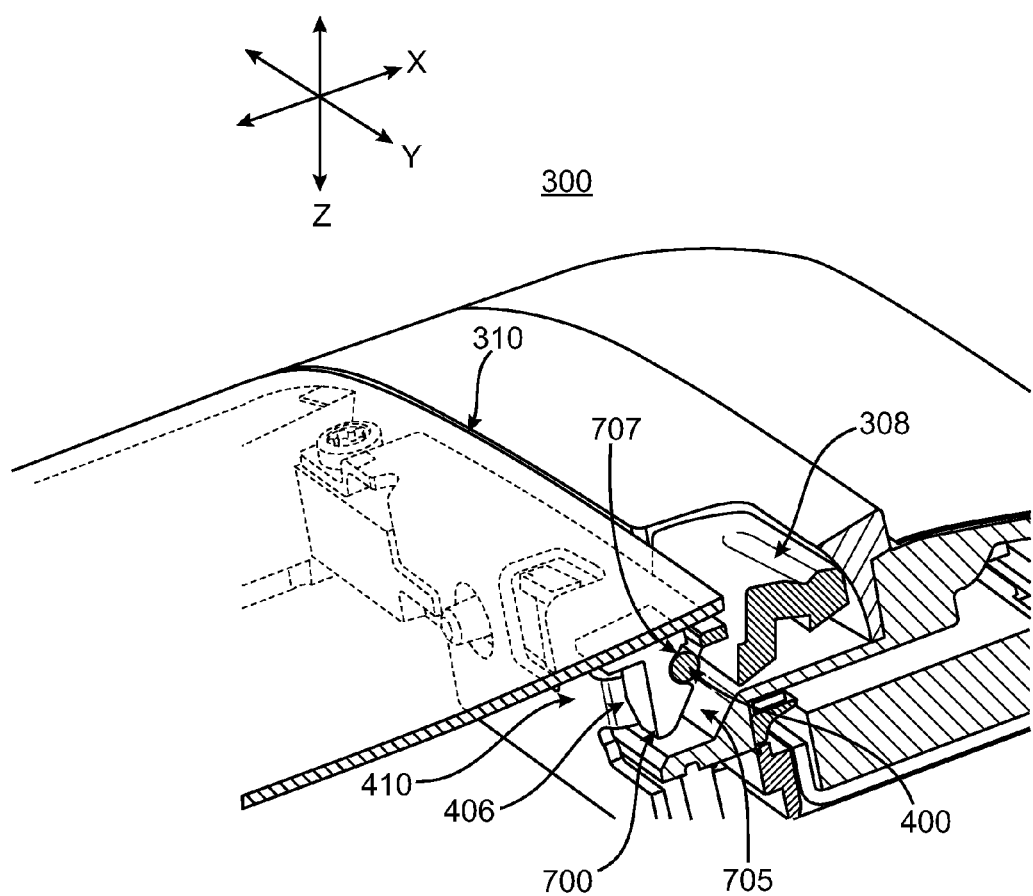
FIG. 7 illustrates a further cross-section of a mobile electronic device in accordance with an exemplary embodiment as illustrated in FIG. 5.

FIG. 7 illustrates a further cross-section of mobile electronic device 100 as illustrated in FIG. 5. As noted with regard to FIG. 6, when the device 100 is in a closed configuration 300, the spring 400 resides within a semi-circular portion 707 of the latch 406. Beneath the semi-circular portion 707 of the latch 406 there is a diagonal portion 705 which begins at the bottom corner of the semi-circular portion 707 and runs down to the bottom of the latch 406. As will be developed further below, it is the diagonal portion 705 of the latch 406 which is urged against the spring 400 when the device 100 is transitioned from an open configuration to a closed configuration. The inner side 700 of the latch 406 is relatively straight and extends substantially perpendicular to the battery door 304.

Figure 8:
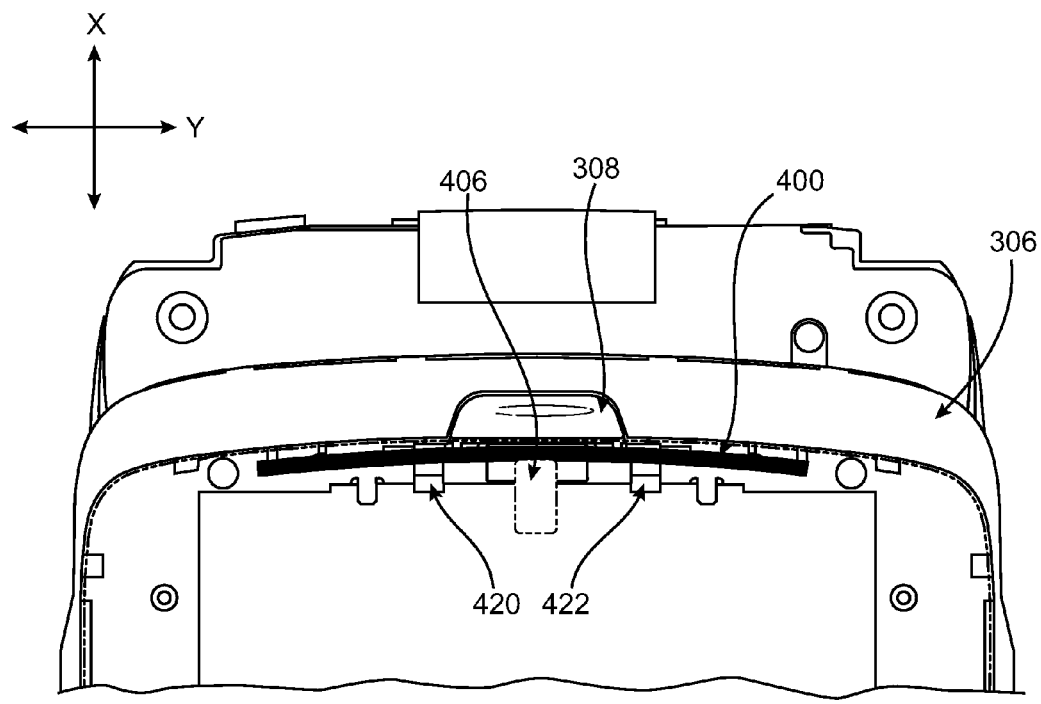
FIG. 8 illustrates a top plan view of a mobile electronic device within the technology in transition from a closed position to an open position in accordance with an exemplary embodiment.

FIG. 8 illustrates a top plan view of a mobile electronic device 100 within the technology in transition from a closed configuration 300 to an open configuration. The spring 400 is maximally deflected by the point on the latch 406 which is intermediate between the curved portion 707 and the diagonal portion 705 of the latch 406. The spring 400 can be seen to be bowed in the positive x direction to an extent greater than shown in FIG. 5.

Figure 9:
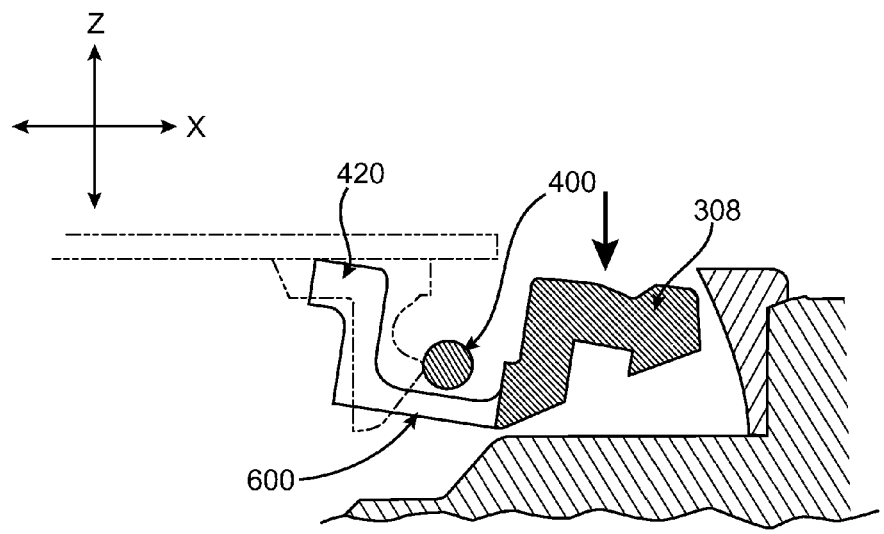
FIG. 9 illustrates a cross-section taken of a door release and retention mechanism in accordance with an exemplary embodiment as illustrated in FIG. 8.

FIG. 9 illustrates a cross-section taken of a door release and retention mechanism as illustrated in FIG. 8. When a sufficient force (as indicated by the arrow) is imposed upon the button 308 in the negative z direction (into the base 306 of the device 100), the foot 420 of the release mechanism pushes against the inner side of the door 304. The foot 420 and the button 308 communicate with one another through the arm 600 and are rotatable along an axis formed by at least one shaft (not shown) extending off of the arm 600 and running substantially parallel to the edge 310 of the door 304 which is adjacent to the latch 406.

Figure 10:
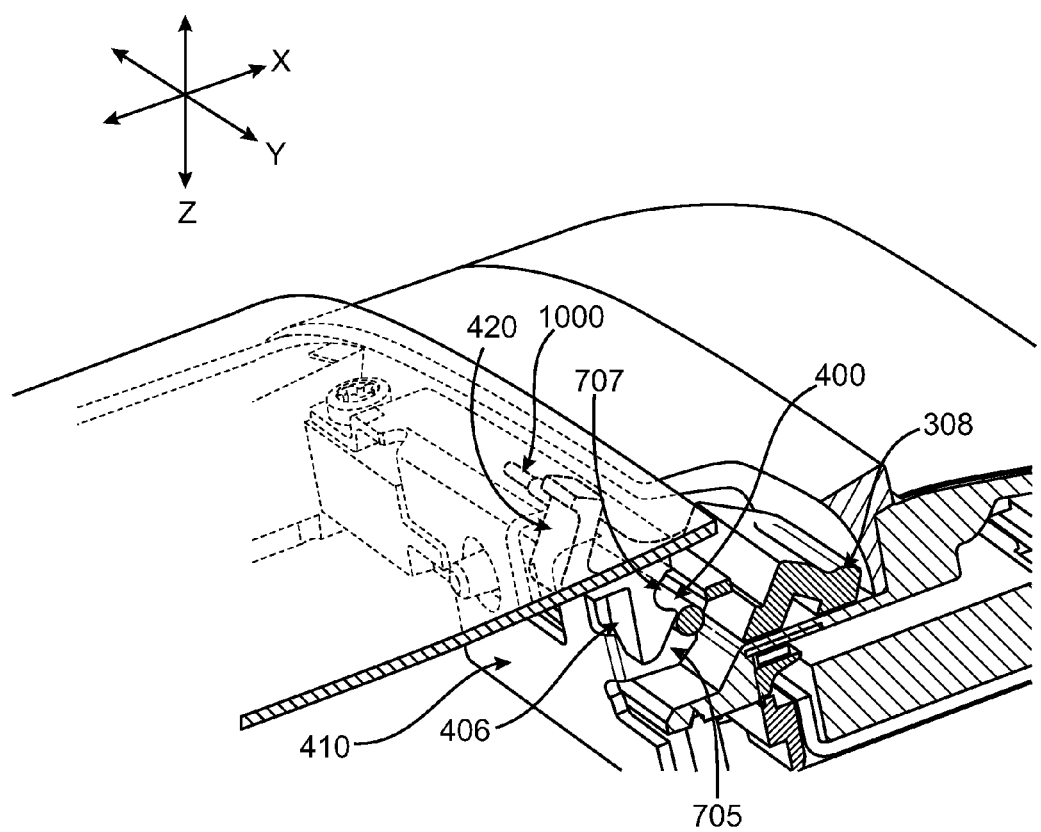
FIG. 10 illustrates a further cross-section of a mobile electronic device in accordance with an exemplary embodiment as illustrated in FIG. 8.

FIG. 10 illustrates a further cross-section of mobile electronic device 100 as illustrated in FIG. 8. The button 308 and foot 420 have been rotated about the axis formed by the shaft 1000 which extends off of the arm 600. The latch 406 can be seen to deflect the spring 400. The spring 400 is attached to the base 306 of the device 100 by the cover plate 410. At its ends, the spring 400 is substantially stationary within the recess between the cover plate 410 and the base 306. As intimated above, there is sufficient space between the cover plate 410 and the base 306 to allow room in which the latch 406 deflects the spring 400.

Figure 11:
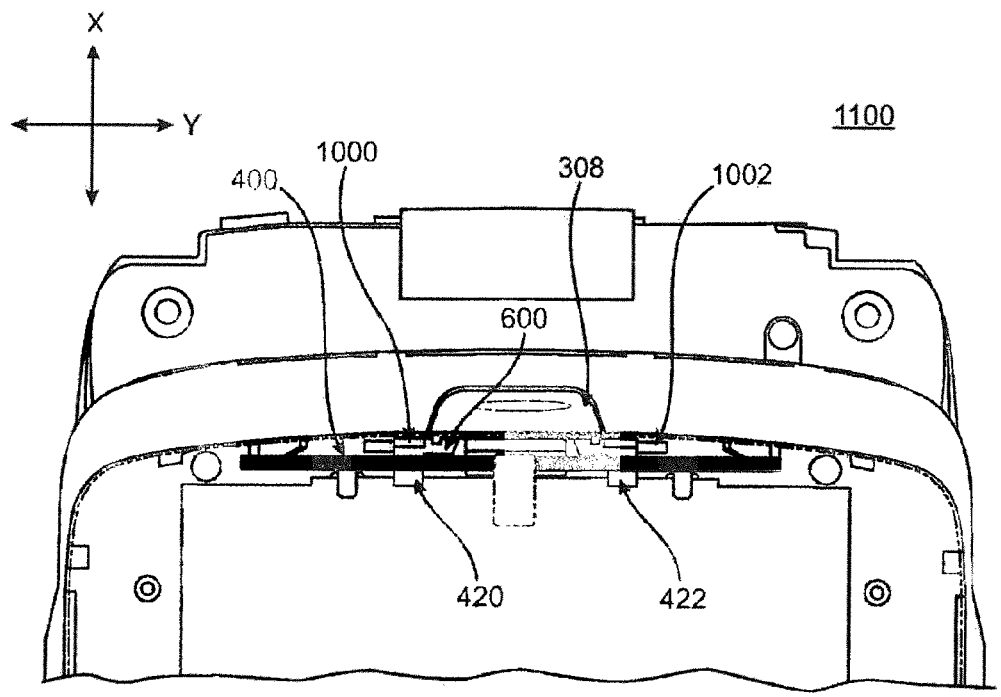
FIG. 11 illustrates a top plan view of a mobile electronic device in an open position in accordance with an exemplary embodiment.

FIG. 11 illustrates a top plan interior view of a mobile electronic device 100 in an open configuration 1100. Without the door 304 in place, a pre-load on the spring 400 would cause the spring 400 to have a very slight bend and to be under strain. A first foot 420 and a second foot 422 join the arm 600 behind the spring 400. The shafts 1000 and 1002 enable the door release mechanism to rotate about the axis they form in a y-axis direction.

Figure 12:
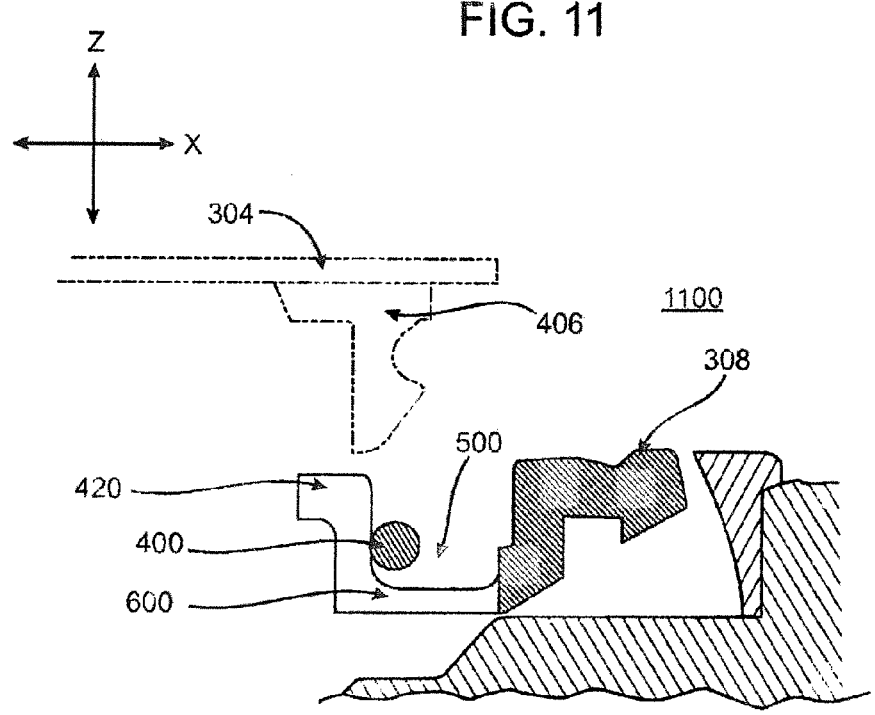
FIG. 12 illustrates a cross-section taken of a door release and retention mechanism in accordance with an exemplary embodiment as illustrated in FIG. 11.

FIG. 12 illustrates a cross-section taken of a door release and retention mechanism 406 as illustrated in FIG. 11. There is a cavity 500 (e.g. 415) in which the latch 406 can deflect the spring 400.

Figure 13:
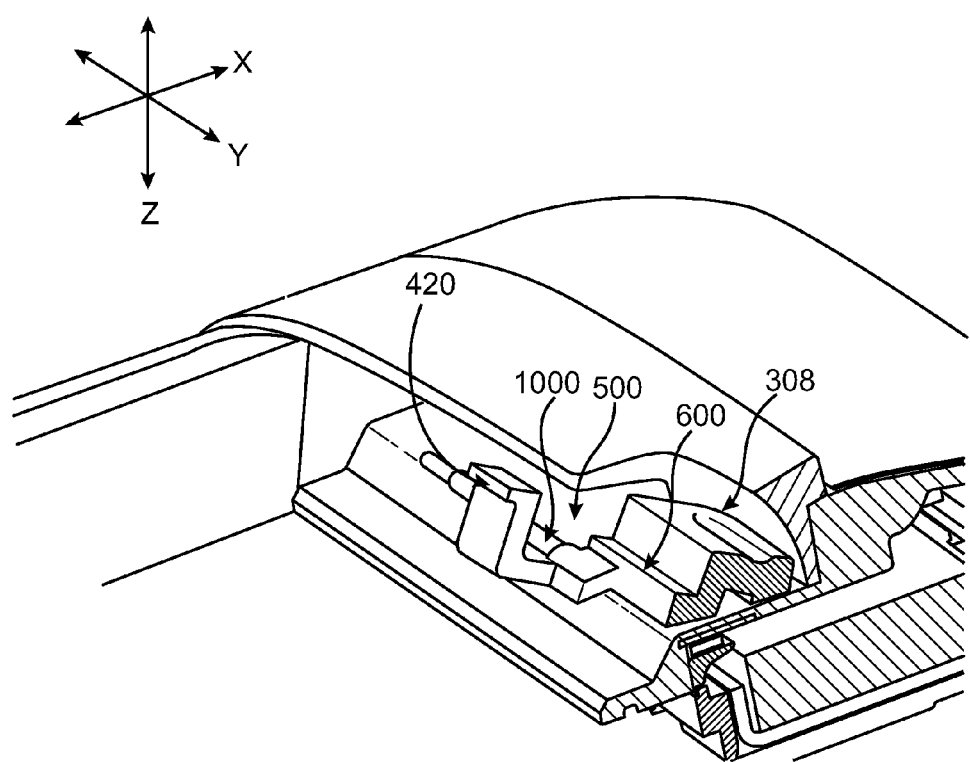
FIG. 13 illustrates a detailed cross-section of a door release mechanism in accordance with an exemplary embodiment.

FIG. 13 illustrates a cross-section of details of a door release mechanism within the technology. A foot 420 for urging the door 304 away from the base 306 in a positive z direction is connected to an arm 600. The arm 600 is attached to the shaft 1000. The arm 600 is further attached to the depressible button 308. The button-foot combination is rotatable about the shaft at the arm 600.

Figure 14:
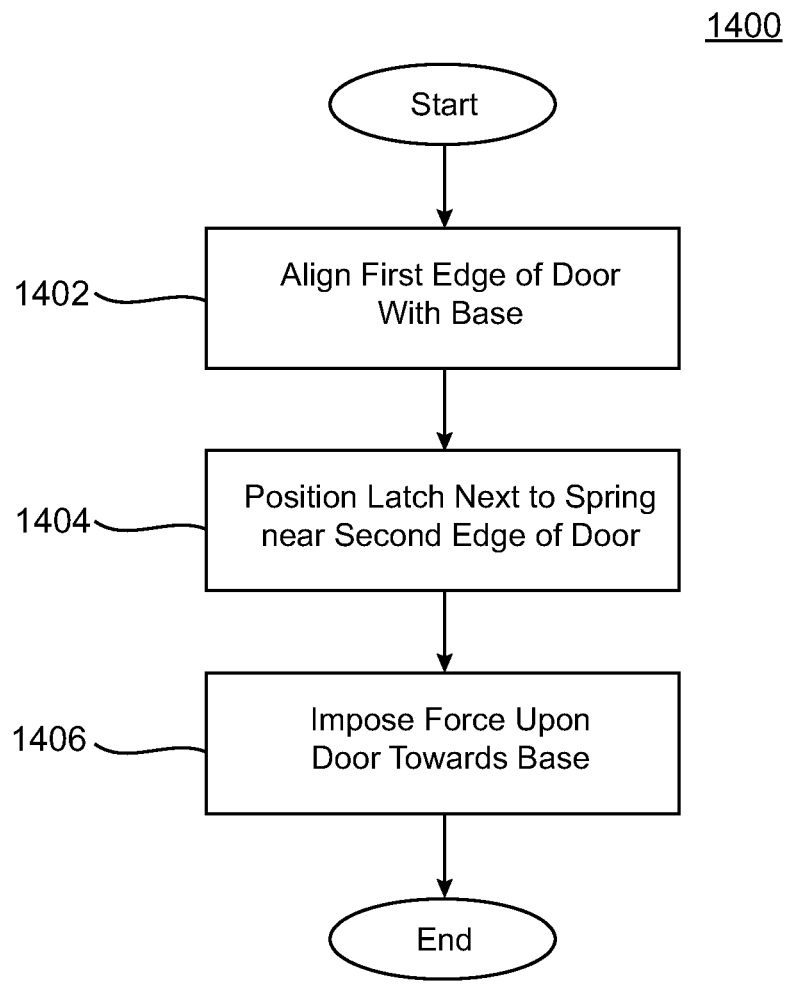
FIG. 14 illustrates a method of closing a battery retention system in accordance with an exemplary embodiment.

FIG. 14 illustrates a method 1400 in accordance with the technology. The method involves aligning 1402 a first edge 312 of a battery cover or door 304 with a corresponding edge 314 within the recess of the base 306 on the rear portion of an electronic device 100. Once the hatch cover 304 is so aligned, the latch 406 is positioned next to the spring 400, 1404. If a force is imposed 1406 upon the door 304 towards the base 306 of the device 100, the latch 406 will press the spring 400 as the latch 406 moves into the base 306. Once the spring 400 is within the curved portion of the latch 406, the device 100 will remain in the closed configuration until the door 304 is opened by the door release mechanism comprised by the at least one foot 420. Thus the door 306 is releasably held in place within the base 306 by the spring 400.

The implementations, examples and descriptions set forth above should in no way be considered as limiting the subject matter of the following claims.

The invention claimed is:

1. A battery retention system for an electronic device, comprising:
   a door;
   at least one latch coupled to said door;
   a base;
   a cover plate attached to the base;
   a spring configured to receive the at least one latch;
   the spring bendably connected to the base by the cover plate and imposing a retention force upon the latch when the system is in a closed configuration;
   at least one foot proximate the door when the system is in the closed configuration;
   at least one shaft having an axis substantially parallel to an edge of the door upon which the latch is coupled; and
   at least one depressible button, coupled to the at least one foot, and connected to the at least one shaft,
   the at least one depressible button and the at least one foot rotatable about the axis to move the door toward an open configuration via a force sufficient to overcome the retention force and transmittable from the button to the foot upon depression of the button.

2. The apparatus of claim 1, wherein the cover plate is attached to the base by a weld.

3. The apparatus of claim 2, wherein the weld is a sonic weld.

4. The apparatus of claim 2, wherein the weld is a laser weld.

5. The battery retention system of claim 1, wherein the spring is a steel spring.

6. The battery retention system of claim 1, wherein the spring has a yield-strength of substantially close to 1590 MPa.

7. The battery retention system of claim 1, wherein the spring is made of a material primarily consisting of tungsten.

8. The battery retention system of claim 1, wherein the spring has a spring constant substantially close to 16.5 N/m$^2$.

9. A latch receiver, comprising:
   a base;
   a cover plate attached to the base;
   a spring configured to receive at least one latch;
   the spring bendably connected to the base by the cover plate and configured to impose a retention force upon the latch;
   at least one foot;
   at least one shaft having an axis substantially parallel to the spring;
   at least one depressible button, coupled to the at least one foot, and connected to the at least one shaft;
   the at least one depressible button and the at least one foot rotatable about the axis to move the foot, upon depression of the button, in a direction opposite a direction of motion of the button.

10. The latch receiver of claim 9, wherein the spring is a steel spring.

11. The latch receiver of claim 9, wherein the spring has a yield-strength substantially close to 1590 MPa.

12. The latch receiver of claim 9, wherein the spring is made of a material primarily consisting of tungsten.

* * * * *

UNITED STATES PATENT AND TRADEMARK OFFICE
CERTIFICATE OF CORRECTION

PATENT NO.       : 8,805,458 B2           Page 1 of 1
APPLICATION NO.  : 13/396262
DATED            : August 12, 2014
INVENTOR(S)      : Patrick Clement Strittmatter et al.

It is certified that error appears in the above-identified patent and that said Letters Patent is hereby corrected as shown below:

IN THE CLAIMS:

Claim 2, column 9, line 23, delete "apparatus" and insert --battery retention system--.
Claim 3, column 9, line 25, delete "apparatus" and insert --battery retention system--.
Claim 4, column 9, line 27, delete "apparatus" and insert --battery retention system--.

Signed and Sealed this
Eleventh Day of November, 2014

Michelle K. Lee
*Deputy Director of the United States Patent and Trademark Office*